US011909590B2

(12) United States Patent
Morrison (10) Patent No.: US 11,909,590 B2
(45) Date of Patent: Feb. 20, 2024

(54) CONFIGURING A NETWORK INTERFACE CARD

(71) Applicant: Hewlett Packard Enterprise Development LP, Houston, TX (US)

(72) Inventor: Corey Casey Morrison, Houston, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 73 days.

(21) Appl. No.: 17/529,350

(22) Filed: Nov. 18, 2021

(65) Prior Publication Data

US 2023/0155886 A1    May 18, 2023

(51) Int. Cl.
| | | |
|---|---|---|
| *H04L 41/0806* | (2022.01) | |
| *G06F 9/4401* | (2018.01) | |
| *H04L 67/1097* | (2022.01) | |
| *H04L 41/12* | (2022.01) | |
| *G06F 13/42* | (2006.01) | |

(52) U.S. Cl.
CPC ........ *H04L 41/0806* (2013.01); *G06F 9/4411* (2013.01); *G06F 13/4282* (2013.01); *H04L 41/12* (2013.01); *G06F 2213/0026* (2013.01); *H04L 67/1097* (2013.01)

(58) Field of Classification Search
CPC . H04L 41/0806; H04L 41/12; H04L 67/1097; G06F 9/4411; G06F 13/4282; G06F 2213/0026

See application file for complete search history.

(56) References Cited

U.S. PATENT DOCUMENTS

| | | | |
|---|---|---|---|
| 8,046,450 B1 | 10/2011 | Schloss et al. | |
| 8,208,396 B2 | 6/2012 | Eisenhauer et al. | |
| 8,713,139 B1* | 4/2014 | Kasper | G06F 9/44505 |
| | | | 709/221 |
| 9,298,658 B2 | 3/2016 | Kallickal | |
| 9,819,515 B1 | 11/2017 | Seal et al. | |
| 9,854,042 B2 | 12/2017 | Anderson et al. | |
| 9,866,443 B1* | 1/2018 | Shih | H04L 69/324 |
| 10,104,017 B2 | 10/2018 | Berman | |
| 2012/0131157 A1* | 5/2012 | Gospodarek | H04L 61/103 |
| | | | 709/222 |
| 2018/0234507 A1* | 8/2018 | Tamir | H04L 41/0816 |
| 2019/0230026 A1* | 7/2019 | Jailani | H04L 41/0213 |
| 2020/0007400 A1 | 1/2020 | Ballard et al. | |
| 2020/0052872 A1 | 2/2020 | Ran et al. | |
| 2022/0206962 A1* | 6/2022 | Kim | G06F 13/102 |

FOREIGN PATENT DOCUMENTS

WO    WO-2017123254 A1    7/2017

* cited by examiner

*Primary Examiner* — Chris Parry
*Assistant Examiner* — Steven C Nguyen (57) ABSTRACT

Examples described herein relate to configuring a Network Interface Card (NIC) of a compute node, such as a server. The NIC may receive an LLDP frame with a first configuration for the NIC. The first configuration is compared with a second configuration. The second configuration corresponds to an existing configuration of the NIC. In response to determining that the second configuration does not match the first configuration, the NIC is configured with the first configuration during a boot-up of the compute node.

20 Claims, 8 Drawing Sheets

CONFIGURING A NETWORK INTERFACE CARD

BACKGROUND

A computing network may include a number of devices connected by data links and may be specialized to perform specific tasks. For example, a computing network may enable network devices to access data storage devices such as disk arrays or the like through data links. Various storage protocols, such as Non-Volatile Memory Express Over Fabrics (NVMeOF), Internet Small Computer System Interface (iSCSI), etc. may be used for accessing data storage devices. These protocols may be used for communication over an Ethernet for transferring data among devices.

BRIEF DESCRIPTION OF THE DRAWINGS

The present disclosure, in accordance with various examples, is described in detail with reference to the following figures. The figures are provided for purposes of illustration only and merely depict examples, wherein.

The figures are not exhaustive and do not limit the present disclosure to the precise form disclosed.

DETAILED DESCRIPTION

Compute nodes/servers may boot their operating system from an internal storage device. The internal storage device may be a hard disk based on a Small Computer Service Interface (SCSI), Serial Advanced Technology Adapter (SATA), or similar storage technologies that have the storage device installed within a server. Servers may use an internal storage device as a boot device for start-up using an operating system (OS) stored on the internal storage device.

However, with the introduction of network storage devices in computing networks, the network storage devices may be preferred over internal storage devices, especially in large organizations and enterprise deployments. For example, a computing network may include storage devices, such as storage arrays or network storage systems, that various compute nodes can connect to in order to access operating systems and user data. Servers may use various storage technologies, such as Direct Attached Storage (DAS), Network Attach Storage (NAS), and/or Storage Area Network (SAN) to store data. These storage technologies may be based on various data communication protocols. Communication protocols (e.g., iSCSI or Fibre Channel (FC)) may be used for the transfer of data between a server and a storage device.

Further, a server may include a Network Interface Card (NIC)/network adapter, acting as an interface for connection with a network. In some instances, the NIC may be connected to an Ethernet switch, which may further connect it to a storage device. In some other instances, a NIC of the server may be directly connected to a NIC of the storage device. In either of the scenarios, compute nodes/servers may have to be configured correctly to access certain resources such as boot disk(s) for network booting of an OS. However, in certain computing networks, there might be a mismatch or misconfiguration of certain features that may interfere with communication between devices (i.e., a server may not have a correct Internet Protocol (IP) address for a storage device). In some instances, a NIC may have certain Peripheral Component Interconnect Express (PCIe) features in a disabled state that may cause failure of a boot process. In certain instances, a NIC may be configured by a manual process for enabling/disabling PCIe functions or providing boot configuration settings. Such a process is time-consuming and prone to human errors. Moreover, in an enterprise deployment, a large number of servers may have to be checked for any misconfiguration and individual servers may have to be accessed or commands may have to be sent for configuring each server with the desired configuration, which makes the process cumbersome. In some other instances, a two-way communication protocol may be used for configuring a NIC and such a process may be susceptible to packet loss.

Various examples described herein are directed to an efficient mechanism for configuring an interfacing device (e.g., NIC) of a compute node, such as a server, particularly for configuring PCIe function(s) and boot parameters for the interfacing device. A misconfiguration of an interfacing device may be identified using the disclosed mechanisms, such that the interfacing device may be reconfigured with a desired configuration in order to access a network storage device (e.g., storage array). According to some examples, to configure an interfacing device with a desired configuration, an interfacing device may establish a data link with a network-connected device. For convenience, such network-connected devices are referred to herein as 'switches.' The interfacing device may send its existing configuration to the switch. The interfacing device may receive an expected configuration (e.g., PCIe functions to be enabled and/or storage boot configuration) from the switch. The interfacing device may compare its existing configuration with the expected configuration, to determine any mismatch. In response to a determination of a mismatch, the interfacing device may reconfigure itself with the expected configuration during a subsequent boot operation of the compute node.

In some examples, a computing network may include a compute node and a switch. The compute node may include an interfacing device. These devices may be configured to generate organizationally specific Type-Length-Value (TLVs) information with configuration related values. The TLVs may be communicated via Layer Discovery Protocol (LLDP) frames that may be periodically advertised by an interfacing device and/or a switch. In some other examples, TLVs may be used to communicate a storage boot configuration for networked booting of a compute node from a storage device. In some examples, the compute node, via the interfacing device, may send an initiator-side TLV. The initiator-side TLV may carry device information corresponding to its existing network boot configuration. Based on the initiator-side TLV that is received, a network administrator at a target-side may identify a mismatch with the expected configuration and trigger a reboot of the compute node to enable reconfiguration.

According to some examples, upon powering ON, a compute node may establish a link with a switch. An interfacing device of the compute node may exchange configurations, not necessarily simultaneously. The interfacing device may identify a mismatch between configurations. For example, the interfacing device may have to enable certain additional functions, such as iSCSI, additional Ethernet functions, or may detect a misconfiguration (e.g., wrong IP setup for an iSCSI boot target). The interfacing device may attempt to apply configuration changes immediately—before the completion of the boot process. In some examples, an interfacing device may communicate a reboot request to the switch, for performing reconfiguration. In some instances, a compute node may undergo a reboot enabling the interfacing device to reconfigure. In some other instances, the interfacing device may prepare for reconfiguration during a subsequent boot operation of the compute node. In some instances, after a reboot operation, configurations may again be exchanged between a compute node and a switch, whereby the latest expected configuration can be communicated and configured for the interfacing device.

The following detailed description refers to the accompanying drawings. Wherever possible, the same reference numbers may be used in the drawings and the following description to refer to the same or similar features, It is to be expressly understood, however, that the drawings are for the purpose of illustration and description only. While several examples are described in this document, modifications, adaptations, and other examples are possible. Accordingly, the following detailed description does not limit the disclosed examples. Instead, the proper scope of the disclosed examples may be defined by the appended claims.

Figure 1A:
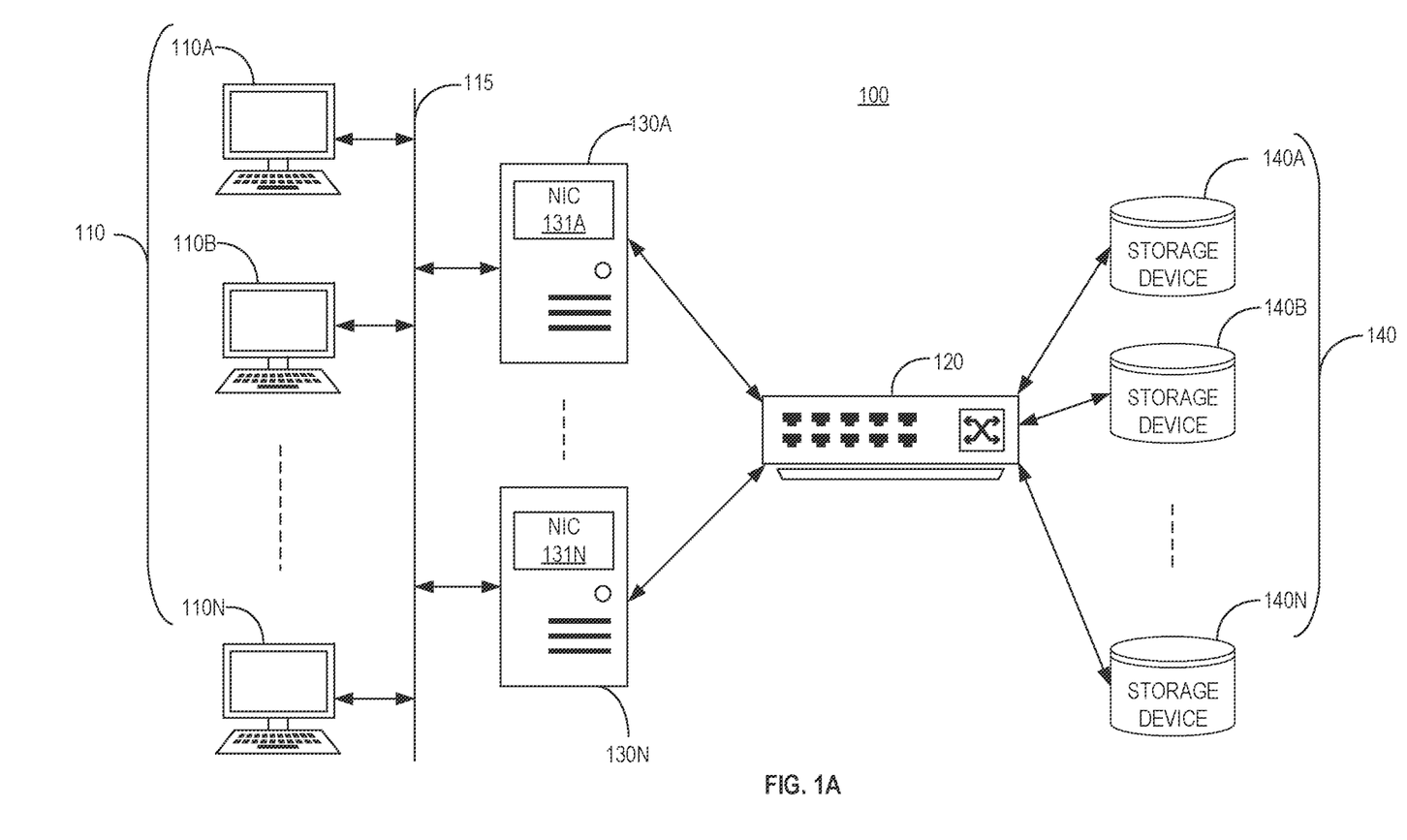
FIG. 1A illustrates a computing network, as per various examples of the present disclosure.

Now referring to the figures, FIG. 1A depicts a computing network 100 in which various of the examples presented herein may be implemented. The computing network 100 may be a data center that is implemented for an organization having multiple users (or at least multiple client devices 110A-110N). The client devices are collectively referred by reference numeral '110.' Examples of client devices may include desktop computers, laptop computers, servers, web servers, authentication servers, Authentication-Authorization-Accounting (AAA) servers, Dornan Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, Personal Digital Assistants (PDAs), mobile phones, smartphones, smart terminals, dumb terminals, virtual terminals, video game consoles, virtual assistants, Internet of Things (IoT) devices, and the like. In some examples, the computing network 100 may be a Storage Area Network (SAN). In some further examples, the computing network 100 may be implemented at one or more physical or geographical sites, for example, a primary site, and/or one or more remote sites (not shown). Each site may include one or more client devices that are coupled through a network-connected device, such as an AP, an Ethernet switch, or the like. In some examples, the sites may be deployed in communication via a network.

In the ongoing example, the client devices 110 may communicate with one or more compute nodes/servers 130A-130N of the computing network 100 via a network 115. The network 115 can be a high-speed network or a cloud network. Further, the computing network 100 includes a switch 120 and one or more storage devices or a storage array 140A-140N. The switch 120 provides router functionality to devices in the computing network 100. For example, the one or more servers 130A-130N may access the storage array 140A-140N (collectively referred to by reference numeral '140') through the switch 120.

Further, the server 130A comprises an interfacing device, such as a NIC 131A. In some other examples, each server 130A-130N may include an interfacing device, such as a NIC, a Converged Network Adapter (CNA), and other Peripheral Component Interconnect Express (PCIe) adapters. For convenience, such interfacing devices may herein be referred to as 'NICs.' Further, the switch 120 may include a plurality of ports, and the one or more servers 130A-130N and the storage array 140 may be coupled to the ports of the switch 120. For example, the one or more servers 130A-130N and the storage array 140 may be connected to the switch 120 through an Ethernet-based network. Examples of the Ethernet-based network may include standards or protocols based on the Institute of Electrical and Electronics Engineers (IEEE) 802.3. In some additional examples, some of the servers 130A-130N may be directly connected to the storage array 140. The computing network 100 may additionally include routers, gateways, and/or access points. The switch 120 may control, configure, and/or manage various devices mentioned above.

Figure 1B:
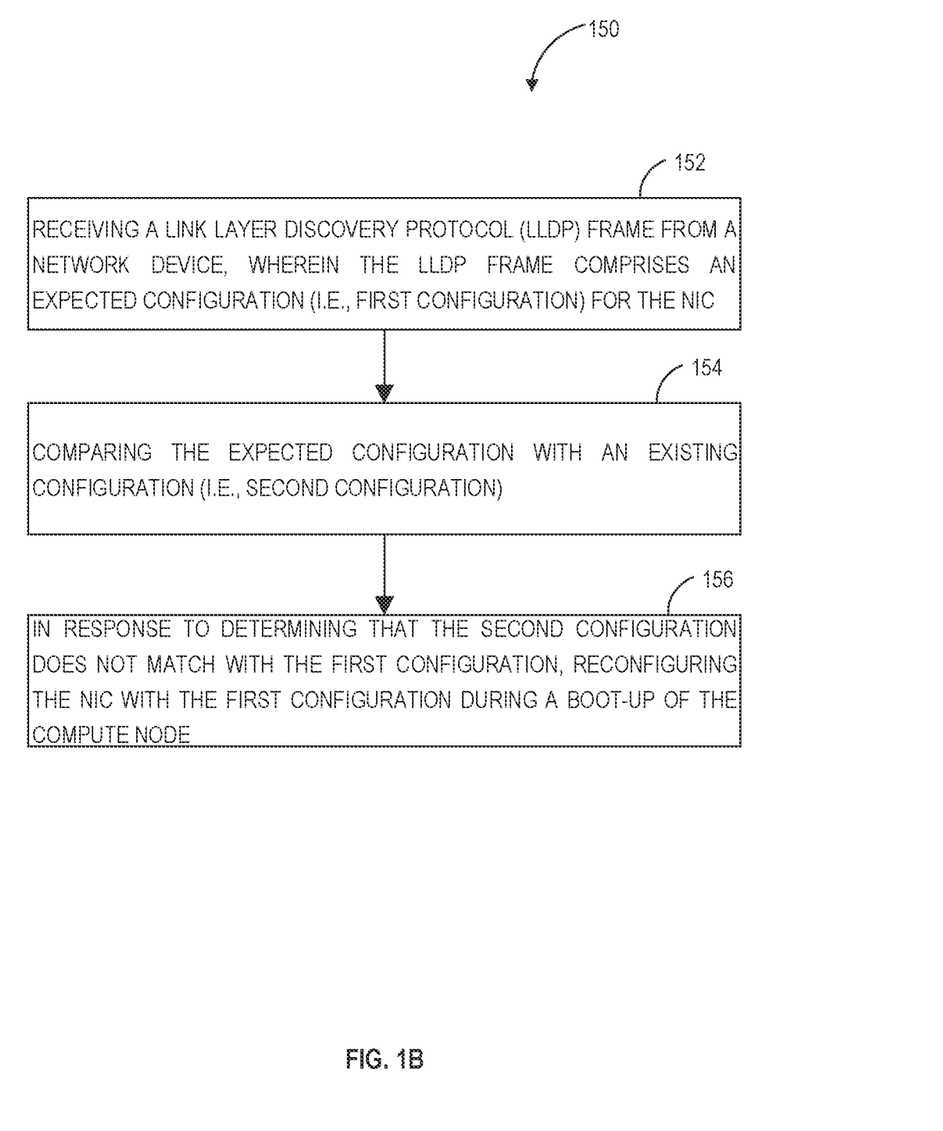
FIG. 1B illustrates a flow diagram depicting a method of configuring a network interface card, as per various examples of the present disclosure.

A mechanism for configuring a NIC of a compute node may be based on a method 150 illustrated in FIG. 1B, as per various examples. The method 150 is discussed below with reference to the server 130A and the NIC 131A corresponding to the server 130A.

According to the method 150, at 152, the server 130A may receive an Ethernet frame/packet from a network-connected device. Further, in some examples, the Ethernet frame may be an LLDP frame encapsulated with an expected configuration (i.e., a first configuration) for the NIC 131A. In some examples, the LLDP frame may include an organizationally specific Type-Length-Value (TLV) that incorporates information corresponding to the expected configuration. The LLDP frame format and the organizationally specific TLVs are further elaborated in FIG. 3. The network-connected device may be the switch 120, according to the illustrative example of FIG. 1A. The server 130A may be capable of accessing a storage array 140 via the switch 120 for booting or for storing user data.

In some examples, the LLDP frames are compliant with the Institute of Electrical and Electronics Engineers (IEEE) 802.1AB standard. Additionally, for some examples, a custom TLV containing configuration information may be based on an organizationally specific TLV (i.e., TLV type 127) as defined by IEEE 802.1AB standard. A custom TLV may be defined by a subtype that is used to specify a category of information it is associated with.

At 154, the NIC 131A may compare the expected configuration that it has received with its existing configuration (i.e., a second configuration). For example, the existing configuration may correspond to PCIe functions and boot configuration of the NIC 131A. The NIC 131A may compare and determine whether a mismatch between the configurations exists.

At 156, the NIC 131A may determine that the expected configuration does not match with the existing configuration. In response to a determination of a mismatch between the configurations, the NIC 131A may configure with the expected configuration during a current/subsequent boot-up of the server 130A.

In some further examples, the switch 120 may be connected to any number of servers. A network administrator may define TLVs at the switch 120 and send them to all the servers connected to it. Any changes made at the switch 120 level may be advertised to all the servers at the same time, enabling ease of configuration. Further, the need for accessing individual servers to check and correct configuration is avoided, and the expected configuration can be periodically advertised to the NICs. Furthermore, the NICs can check the configuration, determine mismatch, and reconfigure itself with minimal human intervention during the process.

Figure 2:
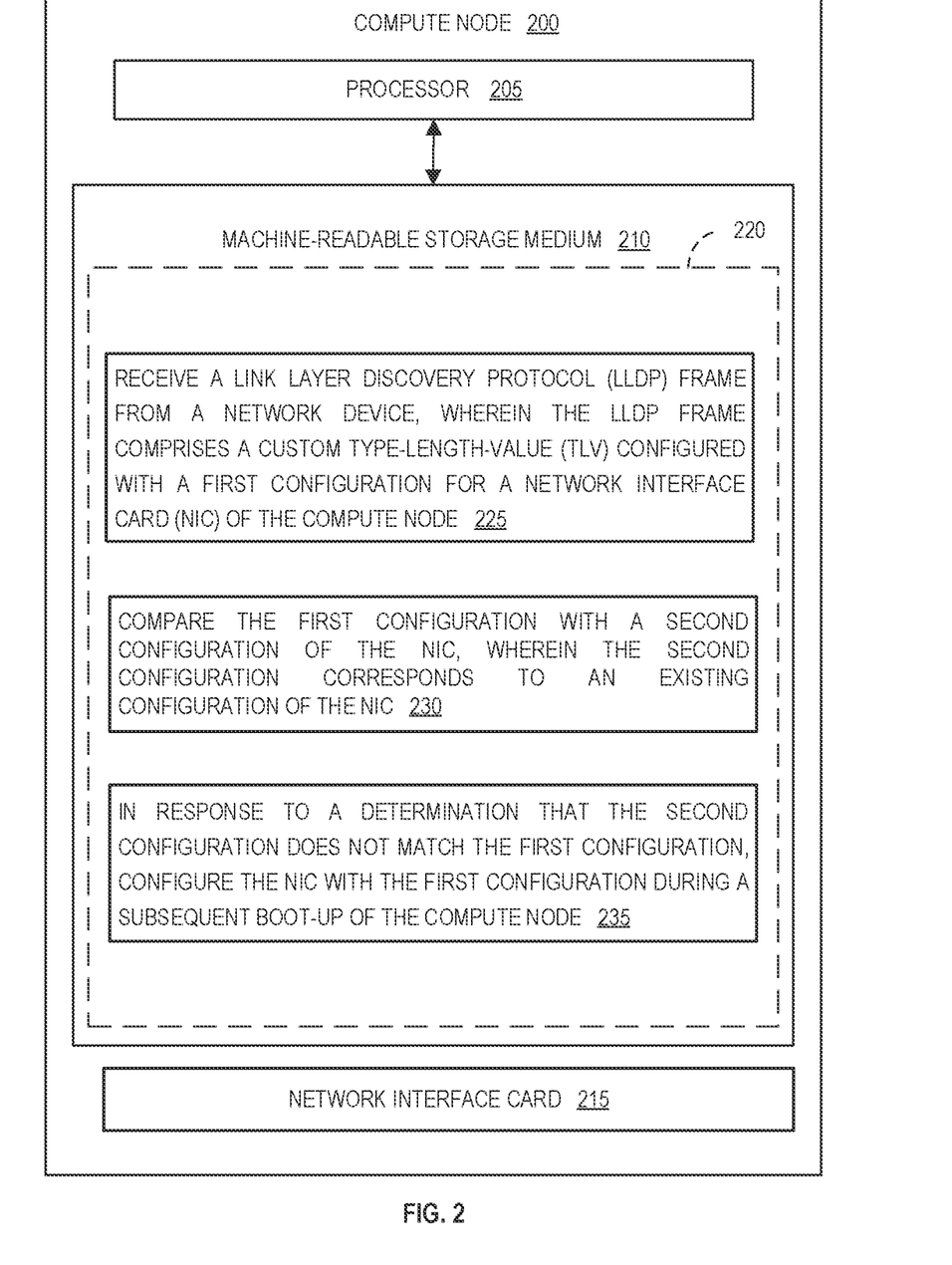
FIG. 2 illustrates a schematic diagram of an example of a compute node, in accordance with various examples according to the present disclosure.

FIG. 2 illustrates a schematic diagram of an example of a compute node 200, in accordance with various examples. The compute node 200 may be a server, such as any of the servers 130A-130N of FIG. 1. The compute node 200 may include a processor 205 and a machine-readable storage medium 210 for configuring a Network Interface Card (NIC) 215, consistent with the present disclosure.

The processor 205 may be one or more central processing units (CPUs), semiconductor-based microprocessors, and/or other hardware devices suitable for retrieval and execution of instructions stored in the machine-readable storage medium 210. The processor 205 may fetch, decode, and execute instructions, such as instructions 220 (e.g., 225, 230, and 235), to configure a NIC 215 of the compute node 200. As an alternative or in addition to retrieving and executing instructions, the processor 205 may include one or more electronic circuits that include electronic components for performing the functionality of one or more instructions, such as a field-programmable gate array (FPGA), application-specific integrated circuit (ASIC), or other electronic circuits.

The machine-readable storage medium 210, may be any electronic, magnetic, optical, or other physical storage devices that contain or store executable instructions. Thus, machine-readable storage medium 210 may be, for example, Random Access Memory (RAM), non-volatile RAM (NVRAM), an Electrically Erasable Programmable Read-Only Memory (EEPROM), a storage device, an optical disc, flash memory, read-only memory (ROM), storage volumes, a hard disk, or a combination thereof. In some examples, the machine-readable storage medium 210 may be a non-transitory storage medium, where the term "non-transitory" does not encompass transitory propagating signals. As described in detail below, the machine-readable storage medium 210 may be encoded with executable instructions, for example, instructions 220. The operations may not be limited to a particular example described herein and may include additional operations such as those described in examples of FIGS. 1A, 1B, 3, 4, 5, 6, and/or 7. Further, instructions shown in FIG. 2 are not limited to the illustrated order, as the instructions may be performed in any other order. One or more of the instructions may be performed at any time, may be performed repeatedly, and/or may be performed by any suitable device(s).

In some examples, the processor 205 may fetch, decode, and execute instructions 225 that may cause the processor 205 to receive an LLDP frame from a network-connected device. The LLDP frame comprises a custom Type-Length-Value (TLV) corresponding to a first configuration for a NIC 215 of the compute node 200. In some examples, the received TLV(s) may indicate whether the NIC 215 may be configured as an Ethernet-only adapter or whether it may have to enable certain transport layer protocols. An iSCSI may be an example of the transport layer protocol that may have to be enabled/disabled. The iSCSI protocol may work on top of a Transport Control Protocol (TCP). In some examples, using iSCSI protocol, block-level SCSI data can be exchanged between the compute node 200 and a storage array.

In some examples, instructions 230 may cause the processor 205 to compare the first configuration with a second configuration of the NIC 215. The second configuration may correspond to an existing configuration of PCIe functions enabled by the NIC 215 and an existing boot configuration of the NIC 215. In some examples, the NIC 215 may include an encoding/decoding component for preparing/decoding an LLDP frame. The received LLDP frame may be decoded to retrieve expected configuration related information from a payload section thereof.

In some examples, instructions 235 may cause the processor 205 to, in response to a determination that the second configuration does not match the first configuration, configure the NIC 215 with the first configuration during a subsequent boot-up of the compute node 200. In some examples, a mismatch may indicate that the NIC 215 has an incorrect boot configuration for the storage array, whereby automatic reconfiguration can be performed with minimal or no manual intervention.

Figure 3:
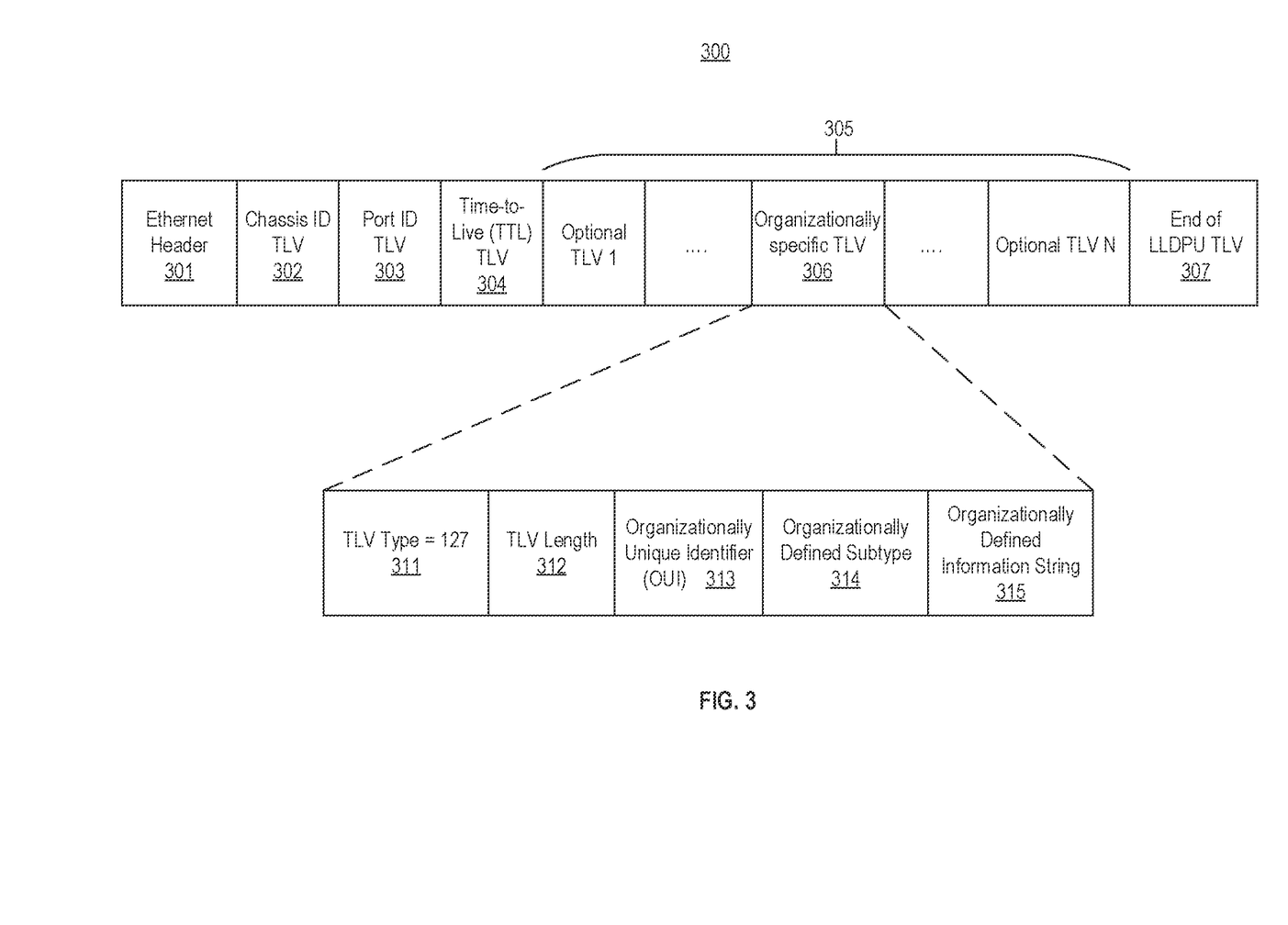
FIG. 3 illustrates a schematic view of a link layer discovery packet frame, according to various examples of the present disclosure.

FIG. 3 is a schematic view of a Link Layer Discovery Packet (LLDP) frame 300, according to various examples of the present disclosure. The LLDP frame 300 may be encoded/generated at a compute node (e.g., the compute node 200 of FIG. 2) or a switch (e.g., the switch 120 of FIG. 1). The LLDP frame 300 with Data Center Bridging Exchange (DCBX) protocol may be used for communicating capabilities and configurations corresponding to NIC/adapter functions and boot configurations for network booting from a storage device (e.g., the storage array 140 of FIG. 1). The LLDP frame 300 may conform to the Institute of Electrical and Electronics Engineers (IEEE) 802.3 standard and may include an LLDP Data Unit (LLDPDU). The LLDPDU may conform to the IEEE 802.1AB standard.

In some examples, the LLDP frame 300 may comprise a sequence of Type-Length-Value (TLV) structures. For example, each LLDP frame 300 may comprise a series of mandatory TLVs, such as an Ethernet header 301, a chassis ID TLV 302, a port ID TLV 303, a time-to-live (TTL) TLV 304, and a set of optional TLVs 305. The optional TLVs 305 may include organizationally specific TLVs 306, which is a customized TLV. The Ethernet header 301 may comprise a preamble, a destination Media Access Control (MAC) address, a source MAC address, and an Ether Type. The chassis ID TLV 302 may identify a device that transmitted the LLDP frame 300. The port ID TLV 303 may identify a specific port through which the LLDP frame 300 is transmitted. The TTL TLV 304 represents a time (seconds) for which the LLDP frame 300 is valid. The LLDP frame 300 may include an organizationally specific TLV 306, which may be configured to communicate configuration related information. The LLDP frame 300 may end with an end of LLDPDU TLV 307.

To identify the organizationally specific TLV 306 to be an organizationally specific TLV, the TLV type may be set to '127' for optional TLVs based on the Institute of Electrical and Electronics Engineers (IEEE) 802.1AB standard. When decoding the LLDP frame 300, the NIC or switch may identify TLVs with a type set to '127' to further decode information. The organizationally specific TLV 306 may be configured to communicate the type of PCIe functions that a NIC (e.g., the NIC 131A) has to present to a host OS of the compute node. In some other examples, the organizationally specific TLV 306 may be configured to communicate by the switch, a desired configuration for downlink port(s) to which storage devices may be coupled. The organizationally specific TLV 306 may include a TLV Type 311, a TLV length 312, an Organizationally Unique Identifier (OUI) 313, an Organizationally defined subtype 314 (hereinafter, 'subtype'), and an organizationally defined information string 315 (hereinafter, "information string").

The present disclosure enables a network administrator to set a common/specific configuration for all downlink ports connected to the switch such that the NICs may configure themselves automatically with the expected configurations. The NIC may send its existing configuration by generating an organizationally specific TLV based on information related to PCIe functions that are enabled and/or boot configuration such that a network administrator can identify a configuration error/mismatch. Due to an error/mismatch, the compute node may not be able to access a storage device. Based on such information, a network administrator may trigger a reboot, whereby during reboot operation the NIC can reconfigure. Upon reconfiguration of the NIC, the compute node can access a storage device for boot and/or data operations. Further, the present disclosure is not limited to organizationally specific TLVs, as any other standardized TLVs capable of carrying configuration information via an LLDP frame can be used.

As per various examples, an organizationally specific TLV corresponding to NIC configuration may be defined by an organizationally defined subtype 1. A Length of these TLVs may range from 2 to 17 bytes, of which a first byte identifies whether this is an "expected" configuration as communicated by a switch OR an "existing" configuration as communicated by a NIC. Expected configuration may be defined as "01" and existing configuration may be defined as "02" in this byte. Other values, like "00" and "03" to "FF" in one example, are reserved for future use. Bytes 2 through 17 may each individually identify an expected port type of the PCIe functions in order enumerating from function number 0 of the physical port. For example, for a NIC with two Ethernet functions, the expected port configuration may be communicated using 2 bytes (e.g., "01 01"). Whereas, for a NIC with four Ethernet functions, two iSCSI, and two FCoE functions, the expected port configuration may be communicated using 8 bytes (e.g., "01 01 02 03 01 01 02 03"). As per one example, the PCIe function types and their reference values are given below:

TABLE 1

Value and a corresponding reference to PCIe function

| Function Type | Value |
| --- | --- |
| Ethernet | 01 |
| iSCSI Offload | 02 |
| Fibre Channel over Ethernet (FCoE) Offload | 03 |
| RDMA over Converged Ethernet (RoCE) Offload | 04 |
| NVMe over TCP Offload | 05 |
| Reserved | 00 |
| Reserved | 06-FF |

In some examples, any PCIe functions which a NIC supports beyond those defined in Table 1, may be considered as "disabled." In some further examples, a NIC may not be capable of configuring itself with the expected configuration, due to the architectural limitations of the NIC. In such instances, the NIC may configure those functions that are supported by the NIC. The NIC function configuration related TLV may take up to 23 bytes (TLV Type 311 [1 byte]+TLV length 312 [1 byte]+OUI 313 [3 bytes]+subtype 314 [1 byte]+information string 315 [17 bytes]=23 bytes). The string format is not limited to the current example. In some other examples, string format may be altered to communicate PCIe functions within the scope of the present disclosure.

Similarly, the network-connected devices may communicate boot configurations to NIC in order to boot via a network-attached storage device. A TLV subtype may enable identifying a boot configuration category and corresponding information format. As per various examples, subtype values corresponding to various TLV categories are summarized below in Table 2 and further elaborated subsequently:

TABLE 2

TLV category and corresponding subtype value

| TLV category | TLV Subtype |
| --- | --- |
| NIC function configuration (existing/expected) | 01 |
| iSCSI boot function (target-side) | 02 |
| iSCSI boot function (initiator-side) | 04 |
| NVMeOF boot function (target-side) | 05 |
| NVMeOF boot function (initiator-side) | 06 |

The TLV subtype values are not limited to the above values. In some other examples, different subtype values may be defined to communicate the boot configuration.

In some examples, TLVs may be categorized into "initiator-side TLVs" and "target-side TLVs." The NIC of the compute node may send initiator-side TLVs and TLVs communicated by a switch or storage device may be target-side TLVs. On a point-to-point link between these network devices, one side may send Initiator-side TLVs, and the other side may send target-side TLVs. If a device configured to send initiator-side TLVs receives an initiator-side TLV, it may be configured to ignore those TLVs. Similarly, a device that is configured to send target-side TLVs may ignore any target-side TLVs that it receives. In some examples, the switch configuration information or storage array configuration information may be communicated to multiple initiator-side devices (e.g., servers) all at once providing ease of configuration. The switch stores the initiator-side TLVs related information for debugging any boot problems associated with compute nodes.

In some examples, TLVs may be configured to communicate Internet Small Computer System Interface (iSCSI) boot configuration information. iSCSI may be used for connecting storage arrays to a network. SCSI commands related to storage may be communicated over Ethernet connections using TCP/IP (i.e., for IP networks).

In some examples, a target-side TLV may correspond to the iSCSI boot function. The target-side TLV for an iSCSI boot function may be categorized as "subtype 02" and with a length ranging from 26 to 249 bytes. The target-side TLV may include values (i.e., information string 315) that indicate a target IP address (IPv4 or IPv6) having a size of 16 bytes. For example, an IPv6 address may use all 16 bytes. In some other examples, an IPv4 address may be represented in a compressed form as "::ffff: hhhh: hhhh." For example, an IPv4 address (192.168.70.50) may be mapped to a 16 byte form as "0000:0000:0000:0000:0000: ffff:c0a8:4632" thereby utilizing the 16 byte allocation. Further, the values may include a target port/socket information represented using 2 bytes, a target Logical Unit Number (LUN) represented using 8 bytes, and a target IQN may take up to 223 bytes.

Similarly, an initiator-side TLV for an iSCSI offload function may have a "subtype 04" and with a length ranging from 35 to 258 bytes. The initiator-side TLV for the iSCSI offload function may include values corresponding to an Internet Protocol (IP) address, a subnet mask, a gateway, a Virtual Local Area Network (VLAN) address, and an initiator iSCSI Qualified Name (IQN). The IP address may take 16 bytes, the subnet mask may take 1 byte, the gateway may take 16 bytes, the VLAN address may take 2 bytes, and the IQN may be an ASCII string with a maximum size of 223 bytes.

In some further examples, the compute node may boot from a device using Non-volatile Memory Express Over Fabrics (NVMeOF), which is a storage access and transport protocol for flash or similar solid-state drives (SSDs). The switch may configure and communicate the storage boot configuration using the LLDP frame. Based on the storage boot configuration, the server may be capable of communicating with a storage device.

A target-side TLV for NVMeOF target information may have a "subtype 5" and with a length ranging from 26 to 249 bytes. The values of TLV for NVMeOF target information may further include a target IP address of 16 bytes, a target port/socket address of 2 bytes, a target namespace ID of 8 bytes, a target NVMeOF Qualified Name (NQN) of 223 bytes.

Similarly, the initiator-side TLV for NVMe over fabric function may have a type categorized as "subtype 6" and with a length ranging from 35 to 258 bytes. The initiator-side TLV for NVMe over fabric function may have values similar to the iSCSI offload function discussed above. Similarly, initiator-side and target-side TLVs may be defined for other communication protocols such as Fibre Channel over Ethernet (FCoE) Offload and RDMA over Converged Ethernet (RoCE) Offload. The NIC and switch may exchange a series of LLDP frames, which is elaborated below.

Figure 4:
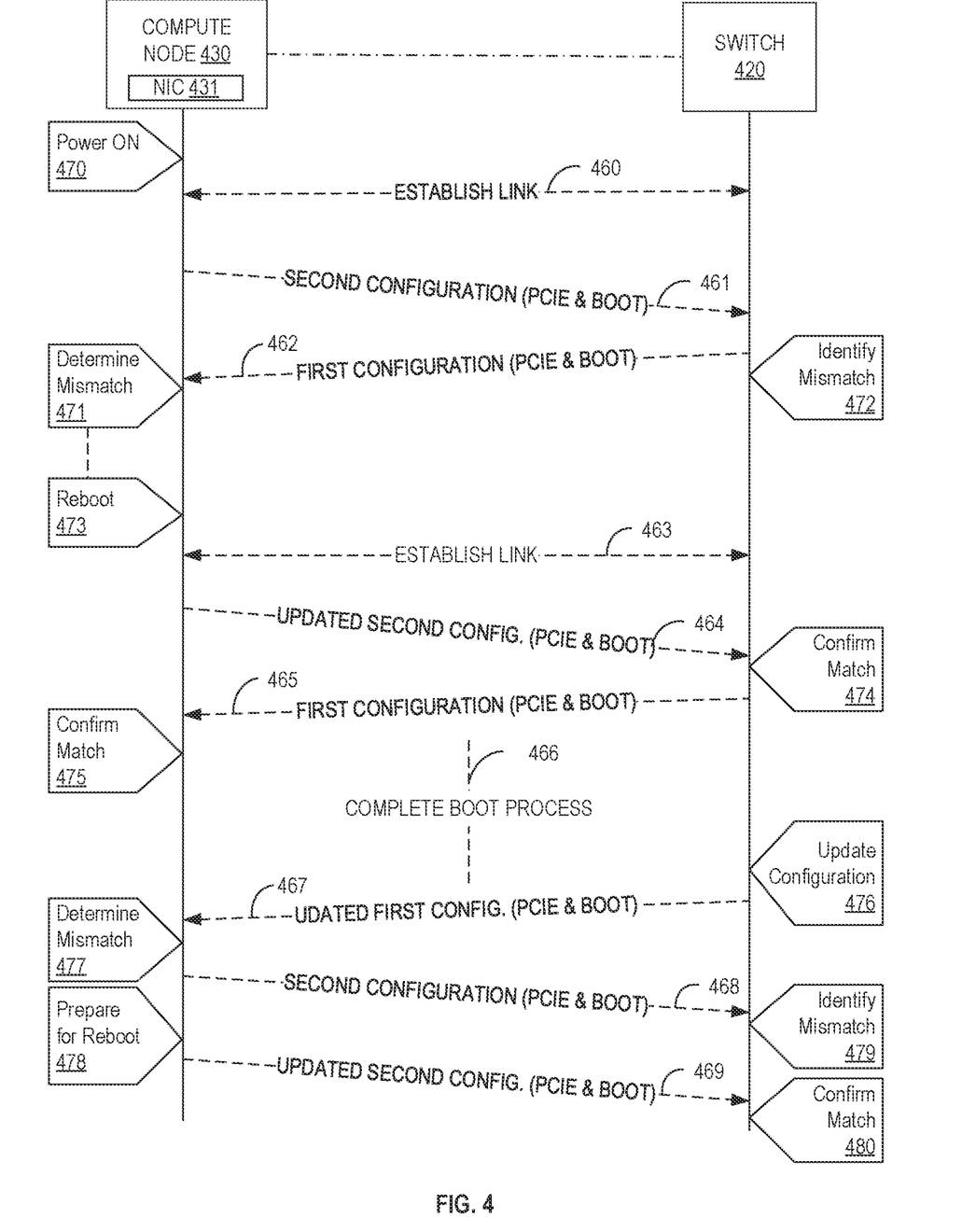
FIG. 4 illustrates a schematic view of a packet sequence, in accordance with various examples of the present disclosure.

FIG. 4 illustrates a schematic view of a packet sequence, in accordance with various examples of the present disclosure. The packet sequence 400 may be between a switch 420 and a NIC 431 of a compute node 430. The switch 420 may be configured to communicate a desired configuration for network devices coupled to downlink port(s). In some other examples, the packet sequence may be between a storage device and the NIC 431.

In the ongoing example, the compute node 430 powers ON 470 and a link may be established 460 between the NIC 431 and the switch 420. The link may be a physical layer link formed between the NIC 431 and a port of the switch 420.

Further, the compute node 430 may initiate a boot sequence. The NIC 431 of the compute node 430 may send a second configuration 461 to the switch 420. The second configuration may correspond to a current NIC configuration, which may include a Peripheral Component Interconnect Express (PCIe) function and boot parameters. The switch 420 may send a first configuration 462 to the NIC 431. The first configuration may correspond to an expected configuration for downlink ports of the switch 420. The NIC 431 may compare the second configuration and the first configuration. Based on the comparison, the NIC 431 may determine a mismatch 471 between the configurations. Similarly, the switch 420 may also compare the received configuration (i.e., the second configuration) with the configuration that was sent, to identify a mismatch 472. In response to the identification of mismatch of configurations, the switch 420 may communicate to management utilities about the mismatch between the configurations. Management utilities may include a switch command-line interface, a management tool for storage network, an integrated IT management solution, a Network Orchestrator, or any other software capable of providing insight into network health or network switch status such that a network administrator can be alerted.

In response to the determination of a mismatch between the configurations, the NIC 431 may perform a reboot 473 (e.g., restart of the computer node 430) to reconfigure the NIC 431 with the first configuration. In some examples, the compute node 430 may include an interface (e.g., Unified Extensible Firmware Interface or device driver) between firmware and an operating system that detects the mismatch. In some examples, an interface may be device firmware itself (e.g., BIOS) that interfaces between hardware and an operating system. The interface may define services that the firmware or hardware has to offer. According to some examples, during boot operation, the interface may control the NIC 431 and may set up the hardware, and may, later on, provide control of the compute node 430 to the operating system. Examples of controlling the NIC 431 may include enabling PCIe functions of the NIC 431 and modifying the boot configuration. The compute node 430 may reboot such that Unified Extensible Firmware Interface (UEFI) reconfigures the NIC 431 with the first configuration.

After the reboot of the NIC 431, again the NIC 431 establishes a link 463 with the switch 420. The NIC 431 may communicate its updated second configuration 464 (i.e., modified second configuration) to the switch 420. The switch 420 may again communicate 465 the expected configuration (i.e., the first configuration) to the compute node 430. The switch 420 may identify/confirm a match 474 between configurations. In some examples, the switch 420 may communicate an updated first configuration, which would have changed during the reboot operation of the compute node 430. The compute node 430 may compare its configuration with this expected configuration that is received. The NIC 431 may confirm a match in configuration. Similarly, the switch 420 may compare the received configuration with the expected configuration, and confirm a match 475 based on the comparison. The compute node 430 may complete the boot process 466 by accessing an operating system from a storage device connected to a downlink of the switch 420.

Further, in certain instances, a network administrator may update the switch configuration 476. The switch 420 may communicate the updated first configuration 467 to the compute node 430. In some examples, the switch may periodically communicate the LLDP frames to the compute node 430, whereby any changes in the configuration are communicated. In some instances, control of the compute node 430 may be handed over to OS. In such instances, the NIC 431 may not be able to change the configuration, even if a mismatch is detected. The NIC 431 of the compute node: communicates its existing configuration 468 to the switch 420 and compares its configuration with the received configuration. Further, in response to determining a mismatch 477 between its existing configuration and the received configuration, the NIC 431 may prepare for the reconfiguration during the next boot 478. A network administrator at the switch 420 may identify a mismatch 479 and may trigger a reboot of the compute node 430.

In some examples, the reboot of the compute node 430 may be voluntary, based on certain reboot conditions being satisfied or a network administrator may perform a reboot operation either directly or through remote access. The NIC 431 may reconfigure its PCIe functions and boot configuration based on the updated first configuration it has received. The NIC 431 may communicate its latest configuration (i.e., the updated first configuration) 469 to the switch and the switch 420 compares the configurations and provides a match. A network administrator may use a NIC 431 to boot via an iSCSI offload function or NVMe over fabric function, and accordingly, communicate a storage boot configuration based on the mechanism discussed herein, using LLDP frame. The switch 420 may compare the configurations and confirm a match 480.

In some examples, the method (e.g., the packet sequence 400) may include repeated and periodic advertising of expected configuration from one side and may not depend on any acknowledgment from other side. Any impact due to packet loss is minimal/nil as the configuration is advertised periodically. The NIC can reconfigure during a subsequent boot without an implicit or explicit time limit for a configuration change. The TLVs can be altered with contents and sent via LLDP frames, based on a change in configuration on at least one of the sides.

Figure 5:
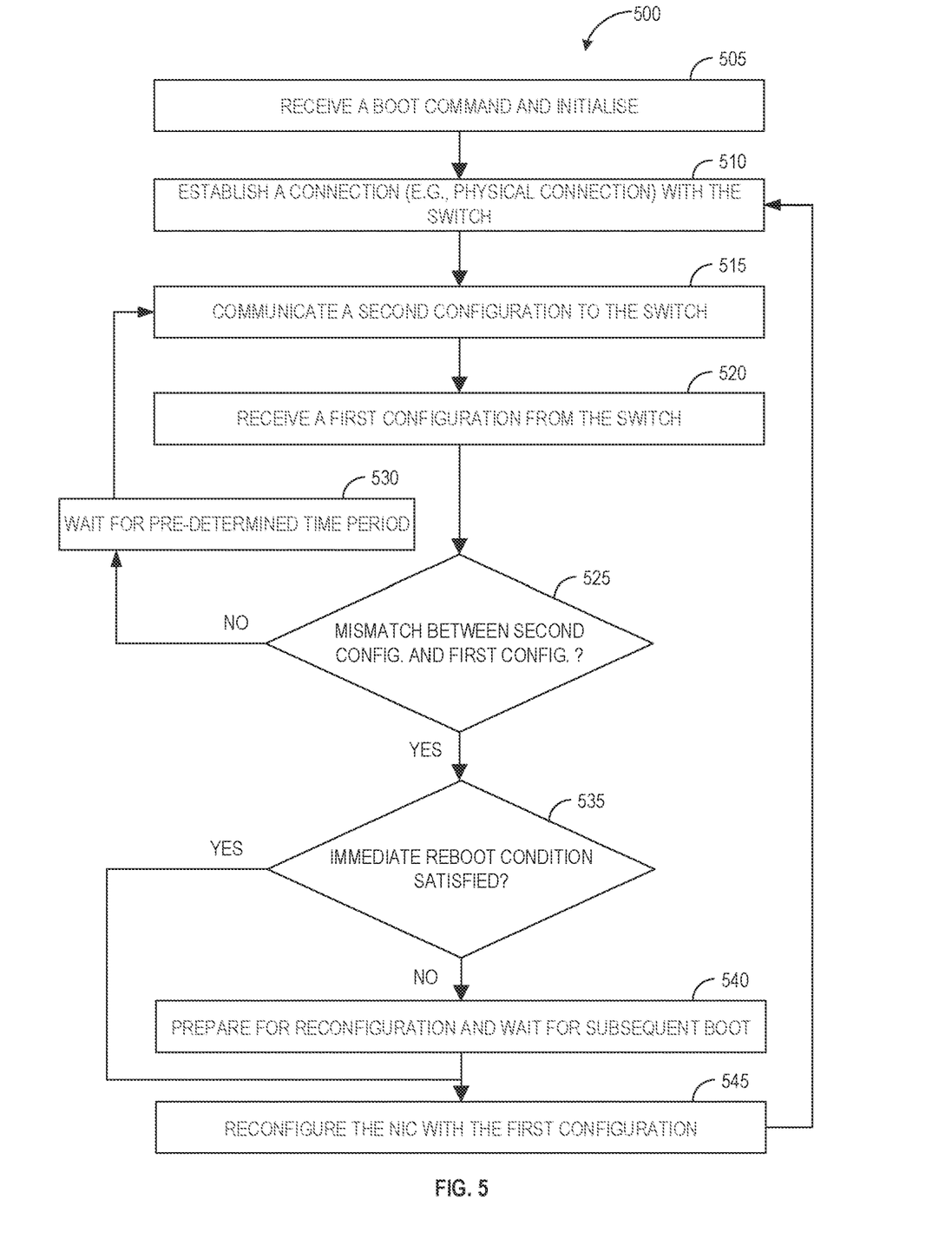
FIG. 5 illustrates another flow diagram used for configuring a network interface card, according to various examples of the present disclosure.

Examples of techniques of the present disclosure may be further elaborated in detail in the following flow diagram 500. FIG. 5 illustrates an example flow diagram 500 involving configuring of an adapter/NIC, for example, a Network Interface Card of a compute node deployed in a computing network, using optional TLVs in LLDP frames. According to the examples described herein, various blocks in the flow diagram 500 can be performed by a NIC (e.g., the NIC 215 shown in FIG. 2). Accordingly, flow diagram 500 is illustrated as a sequence of blocks for brevity and not be construed as the only order. The blocks may be performed at any time, in any order. Additionally, one or more blocks may be repeated or selectively omitted as needed.

At block 505, the compute node may receive a boot command, in response to power ON operation. The compute node may include a BIOS stored on a Read-Only Memory (ROM). In some examples, the BIOS may perform a diagnostic operation to identify hardware devices of the compute node and to identify any abnormalities, such as a voltage irregularity. The BIOS may initialize interfacing devices, such as the NIC. An Ethernet cable may be used to couple the NIC to a port of a network-connected device. The NIC may be a network adapter capable of supporting various communication protocols, such as Ethernet communications protocol, iSCSI Offload, FCoE Offload, RoCE Offload, NVMeOF, or similar communication protocols.

At block 510, the NIC of the compute node may establish a connection with a switch or a storage device that is connected to it. The storage device may include a storage array comprising storage media such as hard disks, solid-state drives, optical drives, or the like. The storage media may be logically divided and provided with a Logical Unit Number (LUN). These Logical Units may be used to store an operating system. In some examples, the NIC of the compute node may establish a physical connection with the storage array. In case of correct configuration, the compute node and the storage array can exchange messages and/or data. For example, the compute node can access boot data from a LUN of the storage array. In instances where a storage disk is absent, BIOS can boot from a specific target IP address corresponding to a LUN of the storage array.

At block 515, the NIC may send an existing configuration (i.e., second configuration) to the switch. The existing configuration may be communicated using an LLDP frame with optional TLVs. For example, a NIC function may be communicated with subtype value 1 and byte-1 value set as '02,' to communicate the existing configuration of the NIC function. Alternatively, or in conjunction, the LLDP frame may include a boot configuration related to TLV (i.e., initiator-side TLV) by including applicable subtype and boot configuration information, as discussed in examples of FIG. 3.

Similarly, at block 520, the NIC may receive a NIC function TLV with subtype 1 and byte-1 value as '01' to communicate an expected configuration (i.e., first configuration) of NIC functions. Alternatively, or in conjunction, the LLDP frame may include target-side TLVs with the boot configuration. In some examples, the NIC may be a hardware component with a dedicated serial number (e.g., MAC address). An LLDP frame may include a destination MAC address sent to the NIC.

In some examples, the NIC upon receiving the LLDP packet, may process all TLVs immediately or store them for processing during an appropriate condition of the server. In some examples, the condition for processing may be based on a boot status of the server. The NIC may include onboard storage to store the received configuration settings between boots. In some examples, the NIC and the switch may communicate the LLDP with frames the respective configuration at pre-determined periodic intervals. Further, if NIC receives any LLDP frames with initiator-side TLVs from another network device, then those TLVs may be ignored. In other words, the NIC may drop frames that encapsulate initiator-side TLVs.

At block 525, the NIC may compare the second configuration with the first configuration. For example, the NIC may compare a target IP address of the existing configuration with a target IP address Based on a condition that there is a match between the configuration ('NO' condition at block 525), the NIC may proceed to block 530. In some examples, the NIC may identify information from TLV(s) of the LLDP frame that is received as part of the first configuration. In some examples, the NIC may process the LLDP frames independent from a processor of the compute node. In some further examples, the NIC may offload a portion of the processing to a driver. The driver may run on a processor of the compute node.

Whereas, upon identification of a mismatch between the second configuration and the first configuration ('YES' condition at block 525), the NIC may check if a reboot condition is satisfied at block 535. In some examples, the reboot condition may include a compute node control that is yet to be handed over to the Operating System (OS), an external reboot trigger from a network administrator is received, or the like.

At block 540, the NIC may prepare for reconfiguration and wait for a subsequent boot operation. The NIC may store the received first configuration for a pre-determined period (e.g., based on the TTL TLV 304 of FIG. 3). In some other examples, based on a condition that the compute node control is yet to be handed over to an OS, the compute node may undergo an immediate reboot. As the switch may periodically advertise the LLDP frames, and the NIC may receive an updated first configuration. The NIC may prepare for reconfiguration based on the updated first configuration.

At block 545, the compute node may be restarted whereby the NIC is configured with the first configuration during boot operation. For example, a target IP address or other setting associated with network boot operation may be modified based on the information received from the switch. Thus, the NIC is configured with the expected configurations, i.e., by enabling one or more PCIe functions and by configuring with expected boot configurations (i.e., first configuration).

Figure 6:
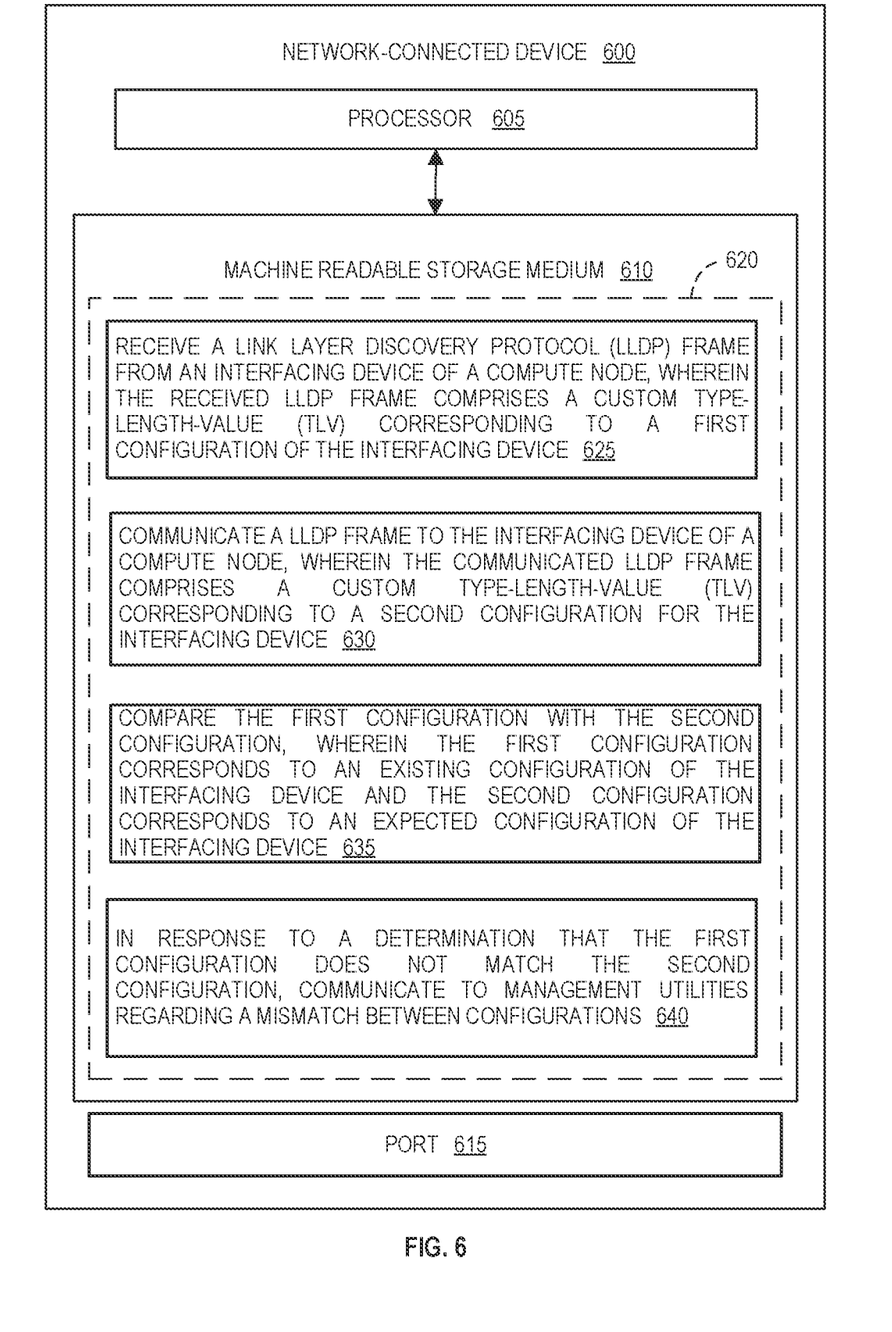
FIG. 6 illustrates a schematic diagram of an example of a network-connected device, in accordance with various examples according to the present disclosure.

FIG. 6 illustrates a schematic diagram of an example of a network-connected device 600, in accordance with various examples. The network-connected device 600 may include, but not limited to, an Ethernet switch. The network-connected device 600 may include a processor 605 and a machine-readable storage medium 610 for configuring a NIC of a compute node (e.g., the compute node 430 of FIG. 4). The NIC may be communicatively coupled to a port 615 of the network-connected device 600. The processor 605 may fetch, decode, and execute instructions, such as instructions 620 stored on the machine-readable storage medium 610.

In some examples, the processor 605 may fetch, decode, and execute instructions 625 that may cause the processor 605 to receive a Link Layer Discovery Protocol (LLDP) frame from an interfacing device of a compute node. The interfacing device may include a Network Interface Card or a plurality of PCIe adapter. The received LLDP frame comprises a custom type-length-value (TLV) corresponding to a first configuration of the interfacing device.

In some examples, instructions 630 may cause the processor 605 to communicate an LLDP frame to the interfacing device. The communicated LLDP frame comprises a custom TLV corresponding to a second configuration of the interfacing device. The custom TLV may be the organizationally specific TLV 306 as defined in FIG. 3.

In some examples, instructions 635 may cause the processor 605 to compare the first configuration with the second configuration. The configurations may be identified from the custom TLV. The second configuration may correspond to an expected configuration of the interfacing device. Similarly, the first configuration may correspond to an existing configuration of the interfacing device.

In some examples, instructions 640 may cause the processor 605 to communicate to management utilities regarding a mismatch between configurations, in response to a determination that the first configuration does not match the second configuration.

In some examples, the instructions 620 may include further instructions to communicate an updated second configuration to the interfacing device, in response to an identification of change in the second configuration. In some other examples, the instructions 620 may include further instructions to trigger a reboot of the compute node for reconfiguration of the NIC.

Figure 7:
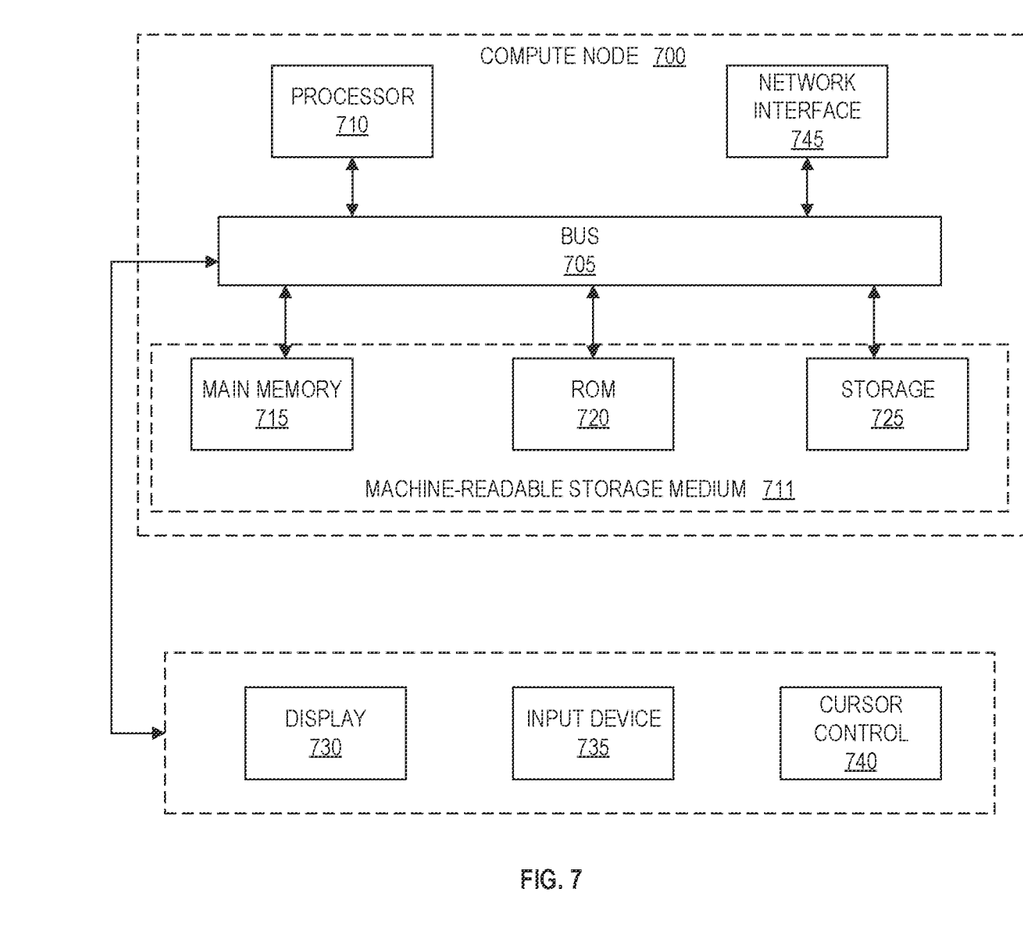
FIG. 7 illustrates a block diagram of an example compute node in which various examples described herein may be implemented.

FIG. 7 depicts a block diagram of a compute node 700 in which various of the examples described herein may be implemented. The compute node 700 may include a bus 705 or other communication mechanisms for communicating information, a hardware processor, also referred to as processor 710, coupled to the bus 705 for processing information. The processor 710 may be, for example, one or more general-purpose microprocessors.

The compute node 700 may also include a machine-readable storage medium 706 communicatively coupled to the bus 705. In some examples, the machine-readable storage medium 706 may include a main memory 715, such as random-access memory (RAM), cache, and/or other dynamic storage devices, coupled to the bus 705 for storing information and instructions to be executed by the processor 710. The main memory 715 may also be used for storing temporary variables or other intermediate information during the execution of instructions to be executed by the processor 710.

The machine-readable storage medium 706 may further include a Read-Only Memory (ROM) 720 or other static storage device coupled to the bus 705 for storing static information and instructions for the processor 710. Further, in the machine-readable storage medium 706, a storage 725, such as a magnetic disk, optical disk, or USB thumb drive (Flash drive), etc., may be provided and coupled to the bus 705 for storing information and instructions.

Further, in some examples, the compute node 700 may be coupled, via the bus 705, to a display 730, such as a liquid crystal display (LCD) (or touch-sensitive screen), for displaying information to a computer user. In some examples, an input device 735, including alphanumeric and other keys (physical or software generated and displayed on touch-sensitive screen), may be coupled to the bus 705 for communicating information and command selections to the processor 710. Also, in some examples, another type of user input device may be a cursor control 740, such as a mouse, a trackball, or cursor direction keys may be connected to the bus 705. The cursor control 740 may communicate direction information and command selections to the processor 710 for controlling cursor movement on the display 730. In some other examples, the same direction information and command selections as cursor control may be implemented via receiving touches on a touch screen without a cursor.

In some examples, This and other modules may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on compute nodes may be provided on a computer-readable medium, such as a compact disc, digital video disc, flash drive, magnetic disc, or any other tangible medium, or as a digital download (and may be originally stored in a compressed or installable format that utilizes installation, decompression or decryption prior to execution). Such software code may be stored, partially or fully, on a memory device of the executing compute node, for execution by the compute node. Software instructions may be embedded in firmware, such as an erasable programmable read-only memory (EPROM). It will be further appreciated that hardware components may be comprised of connected logic units, such as gates and flip-flops, and/or may be comprised of programmable units, such as programmable gate arrays or processors.

The compute node 700 may implement the techniques described herein using customized hard-wired logic, one or more application-specific integrated circuits (ASICs), or Field Programmable Gate Arrays (FPGAs), firmware, and/or program logic which may cause or program the compute node 700 to be a special-purpose machine. According to one example, the techniques herein are performed by the compute node 700 in response to the processor 710 executing one or more sequences of one or more instructions contained in the main memory 715. Such instructions may be read into the main memory 715 from another storage medium, such as the storage 725. Execution of the sequences of instructions contained in the main memory 715 causes the processor 710 to perform the process steps described herein. In an alternative example, hard-wired circuitry may be used in place of or in combination with software instructions.

In some examples, the compute node 700 may include a generic or a specific firmware capable of identifying, initializing, and/or testing hardware thereof. The firmware may further load a boot loader or OS. In some examples, the firmware may be capable of modifying PCIe functions and boot configurations. The firmware may include a Basic Input/Output System (BIOS), Unified Extensible Firmware Interface (UEFI), or the like. The firmware may be executed as a sequence code when the compute node 700 is powered ON. The firmware may perform a Power-on-Self-Test (POST) to determine the functionality of various hardware components.

The compute node 700 also includes a network interface 745 coupled to bus 705. The network interface 745 provides a two-way data communication. The signals through the various networks and the signals on the network link and through the network interface 745, which carry the digital data to and from compute node 700, are examples of forms of transmission media.

The compute node 700 can send messages and receive data, including program code, through the network(s), network link, and the network interface 745. In the Internet example, a server might transmit a requested code for an application program through the Internet, the ISP, the local network, and the network interface 745. The received code may be executed by the processor 710 as it is received, and/or stored in the storage 725, or other non-volatile storage for later execution.

In some examples, the machine-readable storage medium 711 (e.g., one or more of the main memory 715, the ROM 720, or the storage 725) may store instructions which when executed by the processor 710 may cause the processor 710 to execute methods described in FIGS. 1A-5. Some examples of instructions which when executed by the processor 710 may cause the processor 710 to receive an LLDP frame from a network-connected device. The LLDP frame comprises a first configuration for a NIC on the compute node. Instruction which when executed by the processor 710 may cause the processor 710 to compare the first configuration with a second configuration of the NIC. The Instruction which when executed by the processor 710 may cause the processor 710 to, in response to determining that the second configuration does not match the first configuration, configure the NIC with the first configuration during a boot-up of the compute node.

Each of the processes, methods, and algorithms described in the preceding sections may be embodied in, and fully or partially automated by, code components executed by one or more computer systems or computer processors comprising computer hardware. One or more computer systems or computer processors may also operate to support the performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some examples. The methods and processes described herein are also not limited to any particular sequence, and the blocks or states relating thereto can be performed in other sequences that are appropriate or may be performed in parallel, or some other manner. Blocks or states may be added to or removed from the disclosed examples. The performance of certain operations or processes may be distributed among computer systems or computers processors, not only residing within a single machine but deployed across a number of machines.

As used herein, a circuit might be implemented utilizing any form of hardware, software, or a combination thereof. For example, one or more processors, controllers, ASICs, programmable logic arrays (PLAs), Programming Array Logics (PALs), complex programmable logic devices (CPLDs), FPGAs, logical components, software routines, or other mechanisms might be implemented to make up a circuit. In an example, the various circuits described herein might be implemented as discrete circuits or the functions and features described can be shared in part or total among one or more circuits. Even though various features or elements of functionality may be individually described or claimed as separate circuits, these features and functionality can be shared among one or more common circuits, and such description shad not require or imply that separate circuits are required to implement such features or functionality. Where a circuit is implemented in whole or in part using software, such software can be implemented to operate with a computing or processing system capable of carrying out the functionality described with respect thereto, such as the compute node 700.

As used herein, the term "or" may be construed in either an inclusive or exclusive sense. Moreover, the description of resources, operations, or structures in the singular shall not be read to exclude the plural. Conditional language, such as, among others, "can," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise.

What is claimed is:

1. A method, comprising:
receiving, by a Network Interface Card (NIC) of a compute node, a Link Layer Discovery Protocol (LLDP) frame from a network-connected device, wherein the LLDP frame comprises a custom Type-Length-Value (TLV) corresponding to a first configuration for the NIC;
comparing, by the NIC, the first configuration with a second configuration, wherein the second configuration corresponds to an existing configuration of the NIC; and
in response to determining that the second configuration does not match with the first configuration, communicating to management utilities regarding a mismatch between configurations, and configuring the NIC with the first configuration during a boot-up of the compute node by modifying a setting of network boot operation for the NIC based on information from the LLDP frame.

2. The method of claim 1, wherein the existing configuration includes at least one of a Peripheral Component Interconnect Express (PCIe) function configuration and a storage boot configuration of the NIC.

3. The method of claim 1, wherein the network-connected device includes a switch or a network storage device.

4. The method of claim 1, wherein the configuring includes:
causing, by the NIC, an immediate boot of the compute node based on a condition that control of the compute node is not handed over to an operating system.

5. The method of claim 1, wherein the configuring includes:
preparing, by the NIC, for reconfiguration of the NIC during a subsequent boot of the compute node based on a condition that control of the compute node is handed over to an operating system.

6. The method of claim 1 further comprises:
communicating, by the NIC, the second configuration to the network-connected device; and
receiving, by the NIC, a reboot command, in response to a determination that the second configuration does not match with the first configuration.

7. The method of claim 1, wherein the LLDP frame comprises at least one of a first optional TLV and a second optional TLV, wherein the first optional TLV corresponds to a PCIe function and the second optional TLV corresponds to a storage boot configuration, and the first optional TLV and the second optional TLV are differentiated by a subtype.

8. A Network Interface Card (NIC) of a compute node comprising:
a processor; and
a non-transitory storage medium storing instructions, the instructions executable by the processor that cause the processor to:
receive a Link Layer Discovery Protocol (LLDP) frame from a network-connected device, wherein the LLDP frame comprises a custom Type-Length-Value (TLV) configured with a first configuration, wherein the first configuration corresponds to an expected configuration for the NIC;
compare the first configuration with a second configuration of the NIC, wherein the second configuration corresponds to an existing configuration of the NIC; and
in response to a determination that the second configuration does not match the first configuration, communicate to management utilities regarding a mismatch between configurations, and configure the NIC with the first configuration during a subsequent boot-up of the compute node by modifying a setting of network boot operation for the NIC based on information from the LLDP frame.

9. The NIC of claim 8, further comprising instructions that cause the processor to:
communicate the second configuration to the network-connected device; and
receive a reboot command, in response to a determination that the second configuration is different from the first configuration.

10. The NIC of claim 8, wherein the custom TLV corresponds to an organizationally specific TLV with a type 127.

11. The NIC of claim 8, wherein the NIC is a network adapter, and the network adapter is configured to exhibit two or more Peripheral Component Interconnect Express (PCIe) functions.

12. The NIC of claim 8, wherein the NIC is formed by a plurality of Peripheral Component Interconnect Express (PCIe) adapters and each PCIe adapter configured to exhibit a PCIe function.

13. The NIC of claim 12, wherein the PCIe function includes at least one of Internet Small Computer System Interface (iSCSI) Offload, Fibre Channel over Ethernet (FCoE) Offload, RDMA over Converged Ethernet (RoCE) Offload, and Non-Volatile Memory Express Over Fabric (NVMeOF).

14. The NIC of claim 8, wherein the NIC communicates an initiator-side TLV, and the network-connected device communicates a target-side TLV.

15. The NIC of claim 8, wherein the instruction to receive further includes instructions that cause the processor to:
drop one or more initiator-side TLVs received.

16. The NIC of claim 8, wherein the LLDP frame is based on Institute of Electrical and Electronics Engineers (IEEE) 802.1AB protocol.

17. The NIC of claim 8, wherein the compute node includes a firmware to reconfigure the NIC during the subsequent boot-up, and wherein the firmware includes at least one of a Basic Input/Output System (BIOS) and a Unified Extensible Firmware Interface (UEFI).

18. A network-connected device:
a processor; and
a non-transitory storage medium storing instructions, the instructions executable by the processor that cause the processor to:
receive a Link Layer Discovery Protocol LLDP frame from an interfacing device of a compute node, wherein the received LLDP frame comprises a custom Type-Length-Value (TLV) corresponding to a first configuration of an interfacing device;
communicate an LLDP frame to the interfacing device of a compute node, wherein the communicated LLDP frame comprises a custom Type-Length-Value (TLV) corresponding to a second configuration for the interfacing device;
compare the first configuration with the second configuration, wherein the first configuration corresponds to an existing configuration of the interfacing device and the second configuration corresponds to an expected configuration of the interfacing device; and
in response to a determination that the first configuration does not match the second configuration, communicate to management utilities regarding a mismatch between configurations, and modify a setting of network boot operation for the interfacing device based on information from the LLDP frame.

19. The network-connected device of claim 18, wherein the instructions to communicate further comprises instructions that cause the processor to:
   in response to an identification of change in the second configuration, communicate updated second configuration to the interfacing device.

20. The network-connected device of claim 18, wherein the instructions further includes instructions that cause the processor to:
   trigger a reboot of the compute node for reconfiguration of the interfacing device.

* * * * *